(12) United States Patent
Promutico et al.

(10) Patent No.: US 11,001,959 B2
(45) Date of Patent: May 11, 2021

(54) DOOR-LOCK SYSTEM FOR HOUSEHOLD APPLIANCE PROVIDED WITH SUCH SYSTEM AND OPERATION METHOD THEREOF

(71) Applicant: BITRON S.p.A., Turin (IT)

(72) Inventors: Fabrizio Promutico, Turin (IT); Paolo Da Pont, Turin (IT)

(73) Assignee: BITRON S.p.A., Turin (IT)

( * ) Notice: Subject to any disclaimer, the term of this patent is extended or adjusted under 35 U.S.C. 154(b) by 1017 days.

(21) Appl. No.: 15/502,891

(22) PCT Filed: Jul. 16, 2015

(86) PCT No.: PCT/IT2015/000186
§ 371 (c)(1),
(2) Date: Feb. 9, 2017

(87) PCT Pub. No.: WO2016/013037
PCT Pub. Date: Jan. 28, 2016

(65) Prior Publication Data
US 2017/0226684 A1      Aug. 10, 2017

(30) Foreign Application Priority Data

Jul. 21, 2014   (IT) .......................... RM2014A000403

(51) Int. Cl.
*D06F 37/30*      (2020.01)
*D06F 39/14*      (2006.01)
(Continued)

(52) U.S. Cl.
CPC .............. *D06F 39/14* (2013.01); *D06F 33/00* (2013.01); *D06F 37/304* (2013.01);
(Continued)

(58) Field of Classification Search
CPC ........ D06F 39/14; D06F 33/02; D06F 37/304; D06F 2202/12; D06F 2224/00;
(Continued)

(56) References Cited

U.S. PATENT DOCUMENTS 9,777,514 B2 * 10/2017 Haidvogl ................ A47B 88/40
2010/0032968 A1 * 2/2010 Cavallucci .............. E05B 81/14
292/341.16

(Continued)

FOREIGN PATENT DOCUMENTS

DE    102007037767 A1    8/2008
GB         1167720 A     10/1969
WO       2008148788 A2  12/2008

OTHER PUBLICATIONS

International Search Report and Opinion dated Dec. 11, 2015 in corresponding Application No. PCT/IT2015/000186; 13 pgs.

*Primary Examiner* — Kristina R Fulton
*Assistant Examiner* — Thomas L Neubauer
(74) *Attorney, Agent, or Firm* — Maier & Maier, PLLC

(57) ABSTRACT

A door-lock system for a household appliance, such as a washing machine and the like, of the type provided with a door, to which a hook is associated, and a member to be moved (C) of said household appliance, such as a washing drum (C) or the like, said door-lock system comprising motor means for operating said member to be moved (C) and a door-lock device, capable of interacting with said hook, to lock said door, characterized in that said door-lock system comprises a control unit, capable of controlling the power supply of said motor means and connected to said door-lock device, so as to control the power supply to hold said hook and to close said door.

11 Claims, 3 Drawing Sheets

(51) Int. Cl.
*D06F 33/00* (2020.01)
*E05B 47/00* (2006.01)
(52) U.S. Cl.
CPC ...... *E05B 47/0004* (2013.01); *D06F 2202/12* (2013.01); *D06F 2224/00* (2013.01); *E05B 2047/0057* (2013.01); *E05B 2047/0076* (2013.01); *Y02B 40/00* (2013.01)
(58) Field of Classification Search
CPC ......... E05B 47/0004; E05B 2047/0057; E05B 2047/0076; Y02B 40/52
USPC ................................. 292/DIG. 69, 144, 150
See application file for complete search history.

(56) References Cited

U.S. PATENT DOCUMENTS

| 2014/0196508 A1 | 7/2014 | Gelber |
| 2015/0240527 A1* | 8/2015 | Osvatic ................... D06F 37/42 292/144 |

* cited by examiner

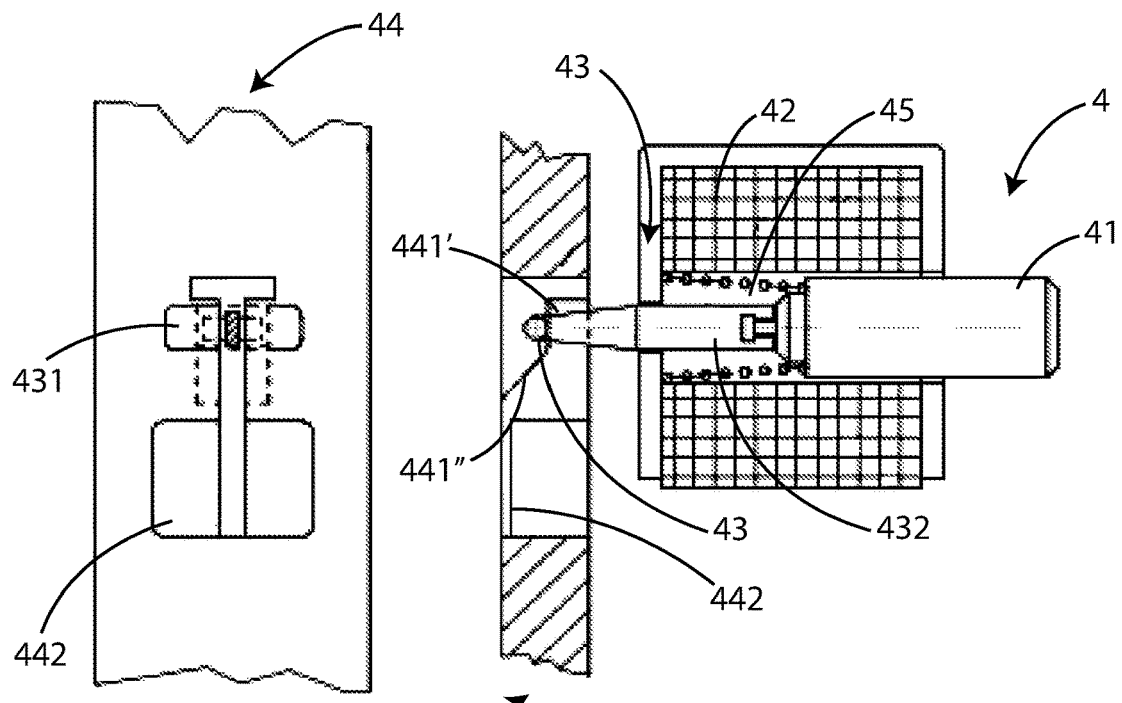
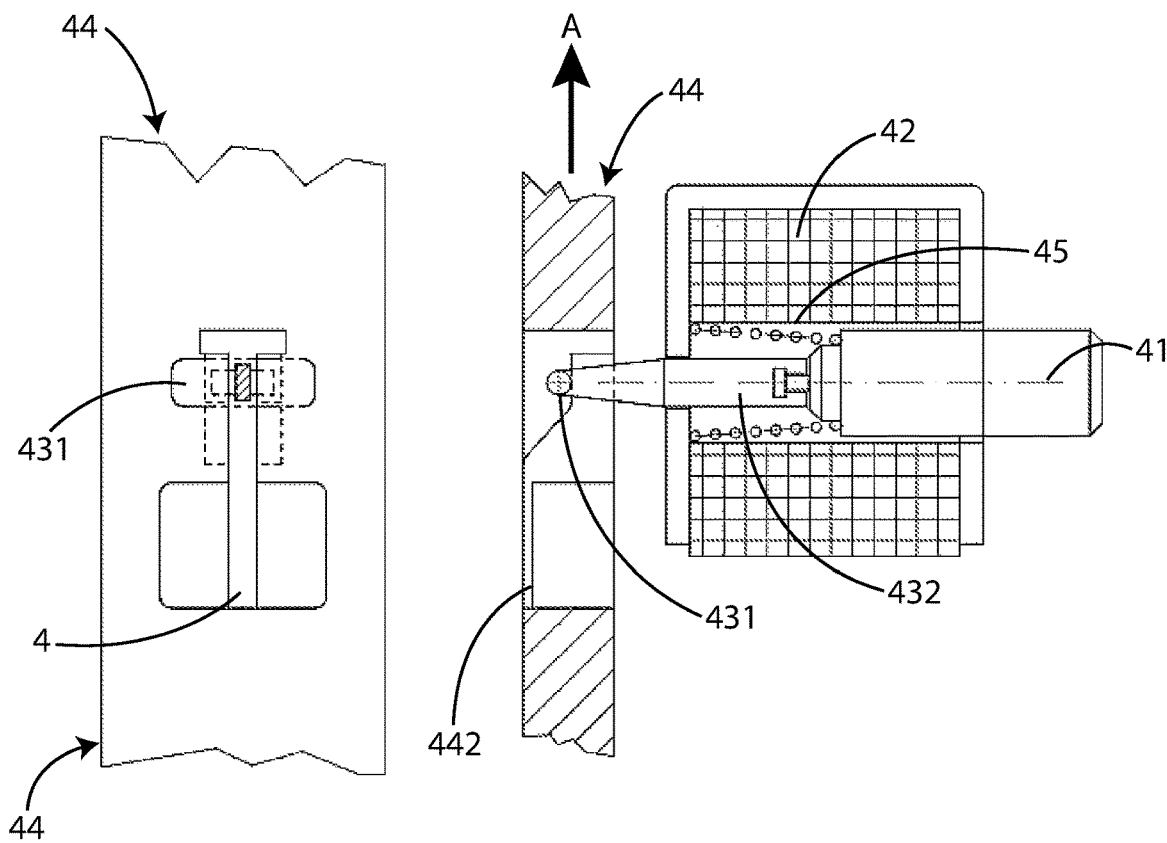

DOOR-LOCK SYSTEM FOR HOUSEHOLD APPLIANCE PROVIDED WITH SUCH SYSTEM AND OPERATION METHOD THEREOF

The present invention relates to a door-lock system for household appliance provided with such system and operation method thereof.

More specifically, the invention concerns a door-lock system that allows a high design flexibility and, at the same time, a high degree of safety.

In the following, the description will be directed to washing machine, but it is clear that the same should not be considered limited to this specific use.

As it is well known at present there is a high number of door-lock devices for washing machines, intended to block a door and, at the same time, to prevent accidental switching off of the washing machine or, for example, because of a sudden absence of supply current, which allows, even accidentally, to open the door with the machine parts that are still in motion. In general, to limit the risks mentioned above there are several design solutions.

A door-lock device among them, for example, provides a slider, having a first slot, with which a hook associated to the door of the washing machine can interfere in the closed position, holding the door closed, and a second slot, capable of assuming a rest position and an active position, wherein said slider blocks the hook closed; and a safety pin, which is also capable of assuming a retracted and an extracted position and it is capable of interfering with the second slot of the slider, blocking its the movement, said safety pin can be actuated by means of the deflection of a bimetal plate in contact with a heating element (PTC). In addition, in order to have a feedback of the position of the safety pin, the closure of an electrical contact is associated to its movement.

These devices operate so that when the door is closed, the hook is inserted in said first slot of the slider. Then, after the activation of the washing machine, the slider moves from said rest position to said active position, blocking the hook, and the PTC resistance is powered, so as to warm up and heat the bimetal plate, which bends, keeping the safety pin in an extracted position. The so extracted pin, interferes with said second slot so as to block said slider and thus the door. If the washing machine is accidentally turned off or the current suddenly fails, the slider would remain in the locked position for a preset time interval, preventing the door to be open, due to the fact that the bimetal would employ said time interval to cool and return to the flat position freeing the pin, which so could go back in the retracted position freeing said slider.

The described solution has the problem that the introduced delay is not related to the physical phenomenon that determines the risk factor. This implies, at design level, the need to have large safety margins with high delays and complications of the control electronics.

In addition, devices like the cited one have a non-negligible cost in industrial terms.

It seems evident that this procedure is costly in both design as well as industrial and economic terms.

The prior art also includes the patent application n. DE102007037767A1.

In light of the above, it is, therefore, object of the present invention providing a door-lock system, in particular for a household appliance, and the relative operating method, which allows to overcome the limits of the door-lock device according to the prior art.

It is therefore specific object of the present invention a door-lock system for a household appliance, such as a washing machine and the like, of the type provided with a door, to which a hook is associated, and a member to be moved of said household appliance, such as a washing drum or the like, said door-lock system comprising motor means for operating said member to be moved and a door-lock device, capable of interacting with said hook, to lock said door, characterized in that said door-lock system comprises a control unit, capable of controlling the power supply of said motor means and connected to said door-lock device, so as to control the power supply to hold said hook and to close said door, said motor means being capable of powering said control unit when they are moving with no power, and said control unit being configured so that, in case of malfunction of said household appliance or of absence of power, said control unit being fed by said motor means, feeds said door-lock device for holding said door closed, until said member to be moved has a kinetic energy lower than a presettable threshold.

Always according to the invention, said motor means could comprise an electric motor of brushless type.

Still according to the invention, said door-lock could comprise a movable core, a coil, within which said movable core is placed, said movable core being configured to assume an extended position from said coil, in which said door is open, an intermediate position, in which said door is closed, and a position inserted in said coil, in which said door is blocked, said coil being powered by said control unit, a locking pin, associated with said movable core, and a slider capable of interacting with said door, preferably with said hook of said door, and associated with said locking pin, said slider being capable of assuming a first position, in which it is disengaged from said door, so that said movable core is in said extended position, and a second position, in which said slider is engaged with said door, so that said movable core is in said intermediate position, said slider being configured to hold said door of said household appliance closed following the interaction with said locking pin, when said movable core is in said position inserted in said coil.

Advantageously according to the invention, said coil could be powered constantly in direct current.

Further according to the invention, said system could comprise a return spring interposed between said movable core and said coil.

Always according to the invention, said locking pin could comprise an end and said slider could have a cam, on which said end of said locking pin abuts, said cam being constituted by a flat part and by a slope, said slider also has a guide slot with which said end of said locking pin can be engaged, such that when said door is closed, the movable core passes from said extracted position to said intermediate position, and when said control unit feeds said coil, said movable core passes from said intermediate position to said position inserted in said coil, so that said end engages with said slot holding said slider in said second position.

Still according to the invention, said control unit could be connected to the terminals of said coil and could be adapted to measure its inductance, so as to detect whether the movable core is in said extracted, intermediate or inserted in said coil position.

Further according to the invention, said control unit could comprise a microcontroller and at least one switch, made by an active device, such as a transistor, MOSFET or IGBT, driven by said microcontroller (21) and connected to said coil to adjust its the power supply.

Advantageously according to the invention, said microcontroller could drive said at least one switch in Pulse Width Modulation (PWM), so that, once the coil is excited, said microcontroller adjusts, by the variation of the duty cycle, the value of the supply voltage of said coil to reduce the peak power.

Always according to the invention, when said household appliance is in operation, said movable core is in said inserted position in said coil and the power supply of said household appliance is interrupted, then, if said member to be moved continue to move, said electric motor would feed said control unit and said control unit would feed said coil, so as to hold the movable core in said inserted position, until said movable member has a kinetic energy lower than said preset threshold.

Still according to the invention, said movable member could be the washing drum of a washing machine and in that said electric motor feeds said coil until said washing drum has a rotation lower than or equal to 20 RPM.

It is further object of the present invention a household appliance, such as a washing machine and the like, comprising a door, to which a hook is associated, and a body to be moved, such as a washing drum or the like, characterized in that it comprises a door-lock system as defined above, said motor means being operatively coupled with said body to be moved.

It is also object of the present invention an operation method of a door-lock system as defined above, said door-lock system being configured for: checking the power supply of said motor means and being powered by said motor means in case of they are in motion with no power supply; detecting when said door is closed and if said door-lock device locks said door; and unlocking said door-lock device when said body to be moved has a kinetic energy lower than a presettable threshold, in case of failure of said household appliance or absence of power supply.

Always according to the invention, said motor means could comprise an electric motor of brushless type, capable of supplying said control unit in case of absence of power, such that, when said household appliance is in operation, said movable core is in said position inserted in said coil and the supply of said appliance is interrupted, then if said member to be moved continue to move, said electric motor supplies said control unit and said control unit supplies said coil, so as to maintain the movable core in said inserted position, until said movable member has a kinetic energy lower than a preset threshold.

Still according to the invention, said method could comprise the steps of connecting said control unit to the terminals of said coil and measuring the inductance of said coil, so as to detect whether the movable core is in said extracted, intermediate or inserted in said coil position.

The present invention will be now described, for illustrative but not limitative purposes, according to its preferred embodiments, with particular reference to the figures of the enclosed drawings, wherein:

FIG. 2a shows a side view of the door-lock device of the door-lock system according to FIG. 1;

FIG. 2b shows a front view of the door-lock device according to FIG. 2a;

FIG. 4a shows a side view of the door-lock device in the configuration in which the door of the household appliance is opened;

FIG. 4b shows a front view of the door-lock device according to FIG. 4a;

In the various figures, similar parts will be indicated by the same reference numbers.

Figure 1:
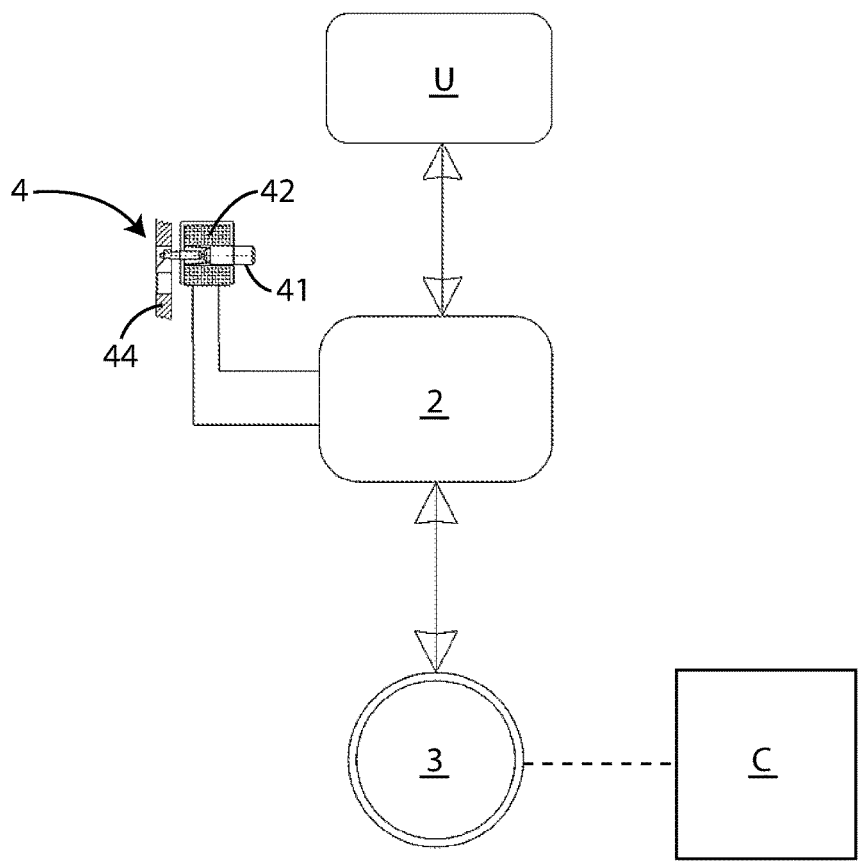
FIG. 1 shows a functional diagram of a door-lock system according to the present invention.

Referring to FIG. 1, it is observed a door-lock system 1 for a household appliance according to the present invention.

Said household appliance comprises a door, to which a hook (not shown in the figures) is associated, a member to be moved C and drive means 3 for driving said member to be moved C. Said system 1 comprises a door-lock control unit 2, a the electric motor 3 and a door-lock device 4.

The control unit 2 is operatively connected to and controlled by the logic unit U of the washing machine and it can also be integrated in the same.

The electric motor 3 is of the brushless type and it is operatively connected to said control unit 2. In particular, said motor 3 includes a stator and a rotor, the latter operatively connected to said washing drum C. The connection between said electric motor 3 and said control unit 2 allows both to operate the motor 3, as well as to allow the power supplying of said control unit 2 itself, as it will be better described below.

Said motor 3 is arranged so as to move a mechanical member of the household appliance, which, in this case, is a washing drum C of the washing machine.

The door-lock 4 (see FIG. 2) comprises a movable core 41, a coil 42, within which is placed the movable core 41. Also, between the movable core 41 and said coil 42 a return spring 45 is interposed. Said coil 42 may possibly be permanently powered with direct current.

Said movable core 41 is capable of assuming a rest position or extracted from said coil 42, an intermediate position, in which, overcoming the force of said return spring 45, is inserted partially into said coil 42, and an active position or inserted in said coil 42, which will be described further below.

Said door-lock device 4 also comprises a locking pin 43 integral with said movable core, having one end 431, a supporting portion 432 of said end 431.

The door-lock device 4 also includes a slider 44 having a cam 441, on which said end 431 of said locking pin 43 abuts. Said cam 44 is constituted by a flat part 441' and by a ramp 441".

The slider 44 has also a slot or guide slot 442, for the support and/or the engagement of said end 431 of said locking pin 43.

Said slider 44 is capable of sliding between a first and a second position, which will be better described below, and also provides a possible return spring (not shown in the figures).

Figure 3:
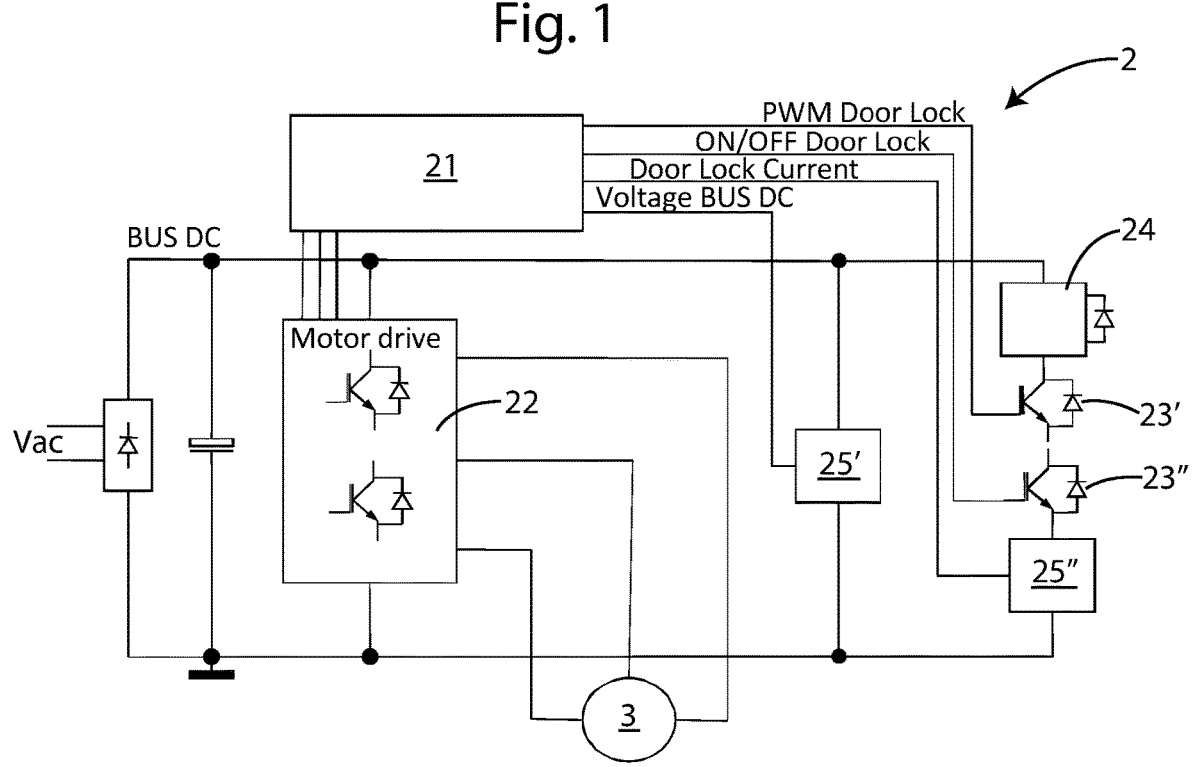
FIG. 3 shows a diagram of the connections of the control unit of the door-lock system according to FIG. 1.

Referring now to FIG. 3, it is observed a more detailed diagram of the control unit 2 and the connections of the door-lock system 1 thereof.

In particular, it is observed that the control unit 2 comprises a programmable microcontroller 21, operatively connected to a power unit 22 for the control and power supply of the brushless motor 3, and a first switch 23', realized by means of an active device, such as a transistor, a MOSFET or IGBT, driven by said microcontroller 21 in PWM (Pulse Width Modulation), to modulate the 310 Vdc supply voltage to the value necessary to energize the coil 42 of the door-lock 4.

Once the coil 42 is energized, the micro-controller 2 can modulate, always in PWM, the value of the retaining voltage of the coil 42 itself, to reduce the peak power.

Said control unit 2 also includes a second switch 23", still made by an active device, such as a transistor, a MOSFET or an IGBT, driven by said microcontroller 21, to realize the safety disconnection in case of short circuit of the drive.

Said first 23' and second 23" switch are connected in series. Said control unit 2 also includes a power unit of the door-lock 24, connected in series with said first switch 23', and driven by it.

Due to safety regulations, the control unit 2 also includes protection electronic circuits (or even PEC—Protective Electronic Circuit).

In particular, said control unit 2 comprises a first electronic protection circuit 25', connected to the terminals of the DC supply voltage of said control unit 2 (BUS), adapted to measure the voltage value of said supply voltage, so as to intervene in case of lack of mains voltage (e.g. power fail) and properly brake the engine 3 before the unlocking of the door-lock device 4; and a second electronic protection circuit 25", connected in series to said first 23' and second 23" switch, adapted to recognize the condition of closed door by the variation of the inductance value of said coil 42 of said door-lock device 4.

It is considered that it is necessary to power the door-lock device 4 with a value of the duty cycle in the PWM power supply so as not to energize the coil 42, but to be able to perform the measurement of the inductance. Furthermore, the current measures of the coil 42 (for example by a shunt resistor) allows the control unit 2 to detect fault conditions such as short circuit or open circuit of the coil 42 itself or the wiring of the circuit in general.

The operation of the door-lock system 1 described above is as follows.

Referring to FIGS. 4*a* and 4*b*, when the door of the washing machine or of the household appliance in general is open, the movable core 41 is held back in the rest position by said return spring 45. In this configuration, said end 431 of said lock pin 43 is in contact with the initial flat part 441' of the cam 441 of the slider 44, while said control unit 2 does not supply said coil 42.

Figures 5A, 5B:
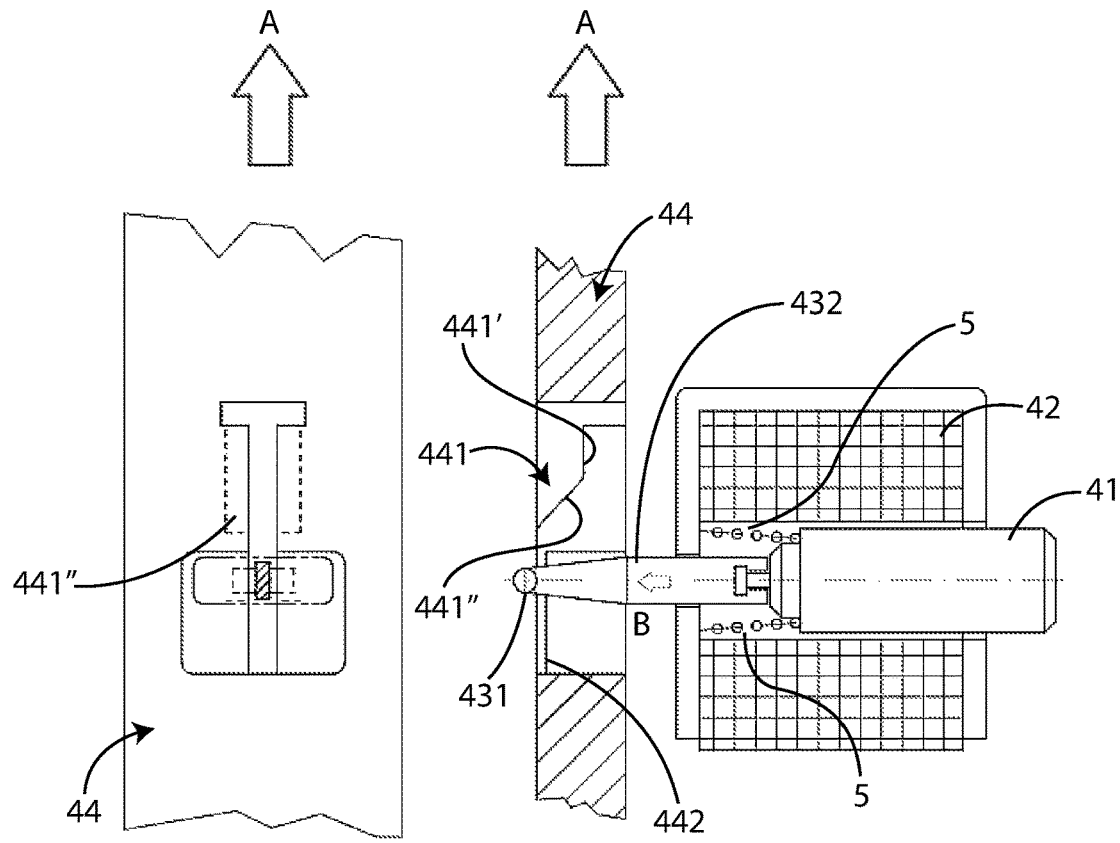
FIG. 5a shows a side view of the door-lock device in the configuration in which the door of the household appliance is closed.
FIG. 5b shows a front view of the door-lock device according to FIG. 5a; is

Closing the door of the washing machine, and referring now to FIGS. 5*a* and 5*b*, the hook interacts with said slider 44, engaging with it, and said slider 44 is moved according to the arrow B, passing from said first to said second position in the direction indicated by the arrow A.

Due to this movement, said end 431 of said locking pin 43 is forced to follow the entire ramp 441" of the cam 44 of the slider 4, while the movable core 41 passes from said extracted position to said intermediate position. In particular, the support portion 432 of the end 431 drags with it the locking pin 43 up to said intermediate position, shown in FIGS. 5*a* and 5*b*.

Said intermediate position of the movable core 41 and the lock pin 43 is an indication of the condition of door closed and can be detected by said control unit 2 of the door-lock system 1, by means of the simple measure of the inductance of the coil 42, proportional to the position (level of introduction) of the movable core 41 in the coil 42 itself, which is detected by said control unit 2.

Figure 6:
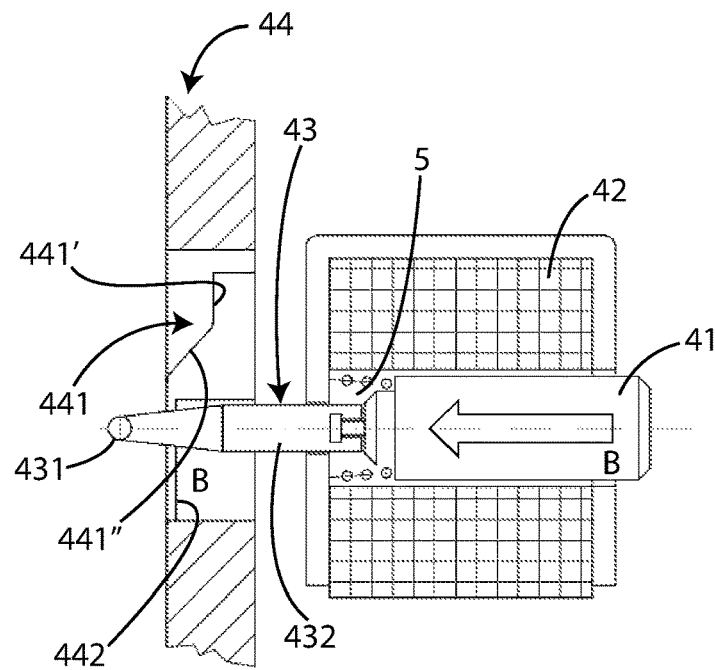
FIG. 6 shows a side view of the door-lock device in the configuration in which the door of the appliance is blocked.

Referring now to FIG. 6, it is observed the configuration of closed door, in which the door is locked. In particular, as a result of a specific activation signal of the logic unit U of the washing machine, the control unit 2 allows the power supply of the coil 42, by actuating said first 23' and second 23" switch, with a suitable driving duty cycle in particular of said first switch 23'.

As a consequence of the supply of the coil 42, the movable core 41 is moved further in the direction of arrow B, by moving forward the locking pin 43 until it engages with said slot 442 of the slider 44, preventing the latter to disengage from the hook of said door, even if said door is opened.

In this configuration further movements of the slider 44 are prevented by said locking pin 43. This configuration, also, of the movable core 41 and of the locking pin 43, which indicates the condition of locked door, can be detected by the electronics of the door-lock system 1, by means of the simple measure of the inductance of the coil 42, which is proportional to the position (degree of introduction) of the movable core 41 in the coil 42 itself, which is detected by said control unit 2.

In the present embodiment, the locking configuration is kept until the coil 42 remains supplied.

In said locking configuration, if the power of the washing machine, or the household appliance in general were interrupted due to accidental causes or, for example, by a child who presses the power button, then the brushless motor 3 would no longer be supplied, but if the washing drum continues to turn for its own inertia, it would rotate the rotor of the brushless motor 3, which then would generate a supply current, for powering said control unit 2 and, through the latter, said coil 42, which thus would keep said locking pin 43 engaged with said slider 44, not allowing the opening of said door.

The door-lock system 1 is configured so that the power supply of said control unit 2 and said coil 42 is sufficient to keep said locking pin 43 engaged with said slider 44, is suitable to overcome the return force of said return spring 45 until the washing drum C of the washing machine has a rotation less than a certain safety threshold, i.e. such as not to be more dangerous in case of door opening. In other words, the door-lock system 1 delays by a time interval, determined as a function of physical characteristics or kinematic related to a physical phenomenon that determines a risk factor, the power supply of the door-lock device 4, and so the opening of the household appliance door.

As it can be observed the door-lock system 1 allows to have a system for detecting the position of the movable core 41 without the use of expensive sensors, such as a Hall sensor. Moreover, said system 1 is structurally and electrically configured to provide a safety delay between the moment, in which the power supply fails, and the one from which opening the door possible to, according to the speed of the drum of the washing machine.

Of course, other alternative door-lock devices 4 in the structure can be implemented in the door-lock system 1 according to the present invention, also for the fact that the control unit 2 is programmable and can be easily adapted to the operation of the specific door-lock device 4.

An advantage of the present invention is that the door-lock device 4 does not have power contacts, but each power switching is electronically controlled by the control unit, i.e. by means of a programmable microcontroller 21. This allows a high versatility of operation and design. In fact, this lack of power contacts and the power supply current at low voltages allows the use of less expensive materials, being low currents involved.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A door-lock system for a household appliance, such as a washing machine and the like, of the type provided with a door, to which a hook is associated, and a member to be moved of said household appliance,
said door-lock system comprising:
 a motor mechanism for operating said member to be moved and
 a door-lock device, capable of interacting with said hook, to lock said door,
wherein said door-lock system further comprises
 a control unit, capable of controlling a power supply of said motor mechanism and connected to said door-lock device, so as to control the power supply to hold said hook and to close said door,
 said motor mechanism being capable of powering said control unit while said member remains in motion, and
 said control unit being configured so that, in case of malfunction of said household appliance or of absence of power, said control unit being fed by said motor mechanism, feeds said door-lock device for holding said door closed, until said member to be moved has a kinetic energy lower than a presettable threshold;
 wherein said control unit is connected to the terminals of said coil and is adapted to measure its inductance, so as to detect whether the movable core is in said extracted, intermediate or inserted in said coil position.

2. The system according to claim 1, wherein said motor mechanism comprises an electric motor of brushless type.

3. The system according to claim 1, further comprising:
 a movable core,
a coil, within which said movable core is placed, said movable core being configured to assume an extended position from said coil, in which said door is open, an intermediate position, in which said door is closed, and a position inserted in said coil, in which said door is blocked, said coil being powered by said control unit,
 a locking pin, associated with said movable core, and
a slider capable of interacting with said door, preferably with said hook of said door, and associated with said locking pin, said slider being capable of assuming a first position, in which it is disengaged from said door, so that said movable core is in said extended position, and a second position, in which said slider is engaged with said door, so that said movable core is in said intermediate position, said slider being configured to hold said door of said household appliance closed following the interaction with said locking pin, when said movable core is in said position inserted in said coil.

4. The system according to claim 3, wherein said coil is powered by direct current.

5. The system according to claim 3, wherein said locking pin comprises an end and said slider has a cam, on which said end of said locking pin abuts, said cam being constituted by a flat part and by a slope said slider also has a guide slot with which said end of said locking pin can be engaged, such that when said door is closed, the movable core passes from said extracted position to said intermediate position, and when said control unit feeds said coil, said movable core passes from said intermediate position to said position inserted in said coil, so that said end engages with said slot holding said slider in said second position.

6. The system according to claim 1, further comprising a return spring interposed between said movable core and said coil.

7. The system according to claim 1, wherein said control unit comprises:
a microcontroller and
at least one switch, made by an active device, such as a transistor, MOSFET or IGBT, driven by said microcontroller and connected to said coil to adjust its the power supply.

8. The system according to claim 7, wherein said microcontroller drives said at least one switch in Pulse Width Modulation (PWM), so that, once the coil is excited, said microcontroller adjusts, by the variation of the duty cycle, the value of the supply voltage of said coil to reduce the peak power.

9. The system according to claim 1, wherein when said household appliance is in operation, said movable core is in said inserted position in said coil and the power supply of said household appliance is interrupted, then, if said member to be moved continues to move, said motor mechanism would feed said control unit and said control unit would feed said coil, so as to hold the movable core in said inserted position, until said movable member has a kinetic energy lower than said preset threshold.

10. The system according to claim 9, wherein said movable member is a washing drum of a washing machine and in that said motor mechanism feeds said coil until said washing drum has a rotation lower than or equal to 20 RPM.

11. A household appliance, such as a washing machine and the like, comprising:
a door, to which a hook is associated, and a body to be moved and a door-lock system as defined in claim 1, said motor mechanism being operatively coupled with said body to be moved.

* * * * *